United States Patent
Gulati et al.

(10) Patent No.: US 9,549,373 B2
(45) Date of Patent: Jan. 17, 2017

(54) METHOD FOR WAKING A DATA TRANSCEIVER THROUGH DATA RECEPTION

(71) Applicant: Apple Inc., Cupertino, CA (US)

(72) Inventors: Manu Gulati, Saratoga, CA (US); Gilbert H. Herbeck, Livermore, CA (US)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 14/444,198

(22) Filed: Jul. 28, 2014

(65) Prior Publication Data

US 2016/0029318 A1    Jan. 28, 2016

(51) Int. Cl.
*H04M 1/00* (2006.01)
*H04W 52/02* (2009.01)

(52) U.S. Cl.
CPC ..... *H04W 52/0235* (2013.01); *H04W 52/0212* (2013.01); *Y02B 60/50* (2013.01)

(58) Field of Classification Search
USPC .............................. 455/572, 550.1; 713/300
See application file for complete search history.

(56) References Cited

U.S. PATENT DOCUMENTS

| | | | |
|---|---|---|---|
| 7,089,338 B1 * | 8/2006 | Wooten | G06F 13/24 710/110 |
| 7,898,994 B2 | 3/2011 | Zhao et al. | |
| 9,026,828 B2 * | 5/2015 | Park | G06F 1/3203 713/300 |
| 2009/0164817 A1 * | 6/2009 | Axford | G06F 1/3203 713/322 |
| 2013/0027177 A1 | 1/2013 | Denison | |
| 2013/0124895 A1 * | 5/2013 | Saha | G06F 1/26 713/323 |
| 2014/0089697 A1 * | 3/2014 | Kim | G06F 1/26 713/320 |
| 2014/0351615 A1 * | 11/2014 | Gupta | H03K 19/0016 713/322 |
| 2015/0035564 A1 * | 2/2015 | Tobin | G06F 1/26 327/56 |

FOREIGN PATENT DOCUMENTS

WO    2013126496    8/2013

OTHER PUBLICATIONS

"MC9S08QE128 MC9S08QE96 MC9S08QE64 Reference Manual", Jun. 2007, 346 pages, Revision 2, Freescale Semiconductor.

* cited by examiner

*Primary Examiner* — Fayyaz Alam
(74) *Attorney, Agent, or Firm* — Meyertons, Hood, Kivlin, Kowert & Goetzel, P.C.

(57) ABSTRACT

A method for managing power in a system, in which the system may include a first device configured to transmit serial data and a second device, coupled to the first device. The second device may include a transceiver and interrupt logic, and may be configured to activate the interrupt logic and enable a reduced power mode for the transceiver. Power consumption of the transceiver operating in the reduced power mode may be less than power consumption of the transceiver in an operating mode. The second device may also be configured to assert an interrupt signal responsive to a change in a voltage level of an input of the second device and then de-activate the reduced power mode for the transceiver responsive to the assertion of the interrupt signal.

20 Claims, 8 Drawing Sheets

METHOD FOR WAKING A DATA TRANSCEIVER THROUGH DATA RECEPTION

BACKGROUND

Technical Field

Embodiments described herein are related to the field of systems-on-a-chip (SoC) and, more particularly, to a data transceiver block in an SoC.

Description of the Related Art

A variety of electronic devices are now in daily use with consumers. Particularly, mobile devices have become ubiquitous. Mobile devices may include cell phones, personal digital assistants (PDAs), smart phones that combine phone functionality and other computing functionality such as various PDA functionality and/or general application support, tablets, laptops, net tops, smart watches, wearable electronics, etc. Generally, a mobile device may be any electronic device that is designed to be carried by a user or worn by a user. The mobile device is typically battery powered so that it may operate away from a constant electrical source such as an electrical outlet.

Many mobile devices may operate in a "standby" mode much of the time. In the standby mode, the device may appear to be "off," in as much as the device is not actively displaying content for the user and/or not actively performing functionality for the user. In the standby mode, much of the device may indeed by powered off. In the background, however, the device may be polling voice and data networks, checking for alarms, reacting to movement, etc.

Because mobile devices are often operating from a limited power supply (e.g. a battery), energy conservation is a key design consideration for the devices. A mobile device may include a system on a chip (SoC) as an aid in energy conservation, since much of the functionality needed in the device can be included in the SoC. In "standby" or other low power modes, it is desirable to power down the SoC to eliminate leakage current losses, which are a significant factor in energy consumption in modern integrated circuit technologies. On the other hand, the SoC may be needed for some of the standby functionality mentioned above.

Some mobile devices may include another processor that may need to communicate with the SoC. For example, mobile phones may include both an SoC and a baseband processor, in which the SoC may handle user interface tasks as well as running many applications while the baseband processor may handle tasks associated with wireless networks such as cellular and Wi-Fi®. In such an arrangement, the SoC may enter a reduced power state if a level of activity is low. The baseband processor may remain active to communicate with networks, for example, to receive an incoming call. In such a case, the baseband may need to interrupt the SoC to get the SoC into a mode in which the baseband processor can communicate with the SoC in order to answer the incoming call.

SUMMARY

Various embodiments of an SoC are disclosed. Broadly speaking, a system, an apparatus and a method are contemplated in which the system may include a first device configured to transmit serial data and a second device, coupled to the first device. The second device may include a transceiver and interrupt logic, and may be configured to activate the interrupt logic and enable a reduced power mode for the transceiver. Power consumption of the transceiver operating in the reduced power mode may be less than power consumption of the transceiver in an operating mode. The second device may also be configured to assert an interrupt signal responsive to a change in a voltage level of an input of the second device and then de-activate the reduced power mode for the transceiver responsive to the assertion of the interrupt signal.

In another embodiment, the second device may be further configured to receive at least a portion of the serial data from first device responsive to the de-activation of the reduced power mode. In a further embodiment, the second device may be further configured to send a request, via the transceiver, to the first device to resend the serial data responsive to a determination that the at least a portion of the serial data is incomplete. In a still further embodiment, to determine that the at least a portion of the serial data is incomplete, the second device may be further configured to calculate a checksum of the at least a portion of the serial data responsive to receiving an end of frame character and then compare the calculated checksum to a received checksum.

In one embodiment, the first device may be further configured to drive a first voltage level on the input of the second device responsive to a determination that a transmit buffer of the first device is empty. In a further embodiment, the first device may be further configured to drive a second voltage level to an input of the second device for a predetermined amount of time. The predetermined amount of time may be greater than or equal to an amount of time for the second device to deactivate the reduced power mode for the transceiver, and the second voltage level may be greater than the first voltage level. In another embodiment, the first device may be further configured to change the voltage level of the input of the second device by sending data to the second device via the input of the second device.

BRIEF DESCRIPTION OF THE DRAWINGS

The following detailed description makes reference to the accompanying drawings, which are now briefly described.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Many mobile devices may include two or more processors, which may communicate with each other. For example, smartphones and tablet computers may include an SoC for running applications and a user interface, and a baseband processor for overseeing communications with wireless networks such as Global System for Mobile Communications (GSM) or Code Division Multiple Access (CDMA) networks. In some mobile devices, the two processors may communicate via any of a variety of suitable methods. Several examples of such chip-to-chip communication methods include serial peripheral interfaces (SPI), inter-integrated circuits (I²C), and universal asynchronous receiver/transmitter (UART). Other suitable communications standards are known and contemplated.

Since mobile devices may be operating with a limited power supply, e.g., a battery, one or both processors may enter reduced power states by changing operating modes and/or by disabling or turning off various functional blocks. A current power state of each processor may be dependent on a current level of activity the processor. For example, the SoC for a tablet that is running multiple applications and active input from a user may be in a fully operational state while the same tablet with only a single application running in a background mode with no active user input may enter a reduced power state to conserve battery power. Similarly, a baseband processor of the tablet may be fully functional while data is being exchanged over a supported network, while the same baseband processor may enter a reduced power state if no data exchange is active. Conditions may exist in which one processor is in an inactive reduced power state while the other is in an active state. In such cases, the active processor may need to communicate with the inactive processor.

Various methods may be employed by the active processor to cause the inactive processor to enter a state in which communication between the processors may occur. One method may be for each processor to use a general purpose output pin connected to an interrupt pin of the other processor. When the active processor wants to communicate with the inactive processor, the active processor may assert its general purpose pin, causing an interrupt in the inactive processor. An interrupt service routine (ISR) may indicate to the inactive processor that the other processor wants to communicate. Such a method may require two or more pins, in addition to pins used for communication, to be dedicated to the chip-to-chip communications. In some embodiments, this may be an adequate solution. In other embodiments, however, additional connections between processors may be undesirable due to a limited number of pins on one or both processors, a limited amount of circuit board space for making the additional electrical connections between the processors, or due to other reasons.

Such methods may also require an active processor to be aware of the power state of the other, inactive processor to know when to use the additional pins to wake the inactive processor. In some embodiments, the active processor may be a general purpose controller which may be capable of keeping track of the other processor's state with minimal processing overhead. In other embodiments, however, the active processor may be special purpose device, such as, for example, a baseband processor for a cellular phone or a graphics processor for a laptop or tablet. Such special function-specific devices may require additional processing overhead to track the state of the other processor that would take processing power from their intended functions.

Embodiments of a communications system will be presented herein to demonstrate a method for establishing communication between an active processor and an inactive processor. These embodiments may provide a communications protocol that allows one processor to wake another without additional hardware connections between the processors. These embodiments may also allow each processor to enter reduced power, inactive modes as necessary without requiring the active processor to keep track of the inactive processor's state.

System-on-a-Chip Overview

Figure 1:
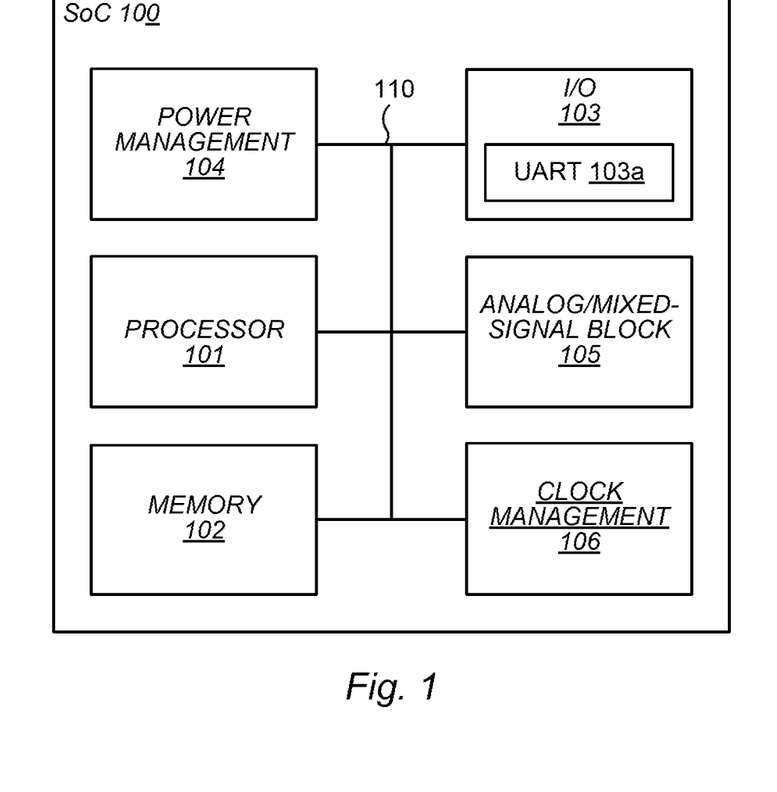
FIG. 1 is a block diagram of an embodiment of an SoC.

A block diagram of an embodiment of an SoC is illustrated in FIG. 1. In the illustrated embodiment, the SoC 100 includes a processor 101 coupled to memory block 102, I/O block 103, power management unit 104, analog/mixed-signal block 105, clock management unit 106, all coupled through bus 110. In various embodiments, SoC 100 may be configured for use in a mobile computing application such as, e.g., a tablet computer or smartphone.

Processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processor 101 may include multiple CPU cores and may include one or more register files and memories.

In various embodiments, processor 101 may implement any suitable instruction set architecture (ISA), such as, e.g., PowerPC™, or x86 ISAs, or combination thereof. Processor 101 may include one or more bus transceiver units that allow processor 101 to communication to other functional blocks within SoC 100 such as, memory block 102, for example.

Processor 101 may also, in some embodiments, include circuits for detecting and servicing interrupt requests. Interrupt requests may come from a variety of sources such as, for example, other functional blocks or pins coupled to other chips via a circuit board. Responsive to one or more interrupt request signals being asserted, the circuitry in processor 101 may determine a priority level of the source of the interrupt and based on the determined priority, may or may not cause processor 101 to execute a set of instructions for servicing the interrupt. In other embodiments, the circuits for handling interrupts may be included in a functional block other than processor 101.

Memory block 102 may include any suitable type of memory such as, for example, a Dynamic Random Access Memory (DRAM), a Static Random Access Memory (SRAM), a Read-only Memory (ROM), Electrically Erasable Programmable Read-only Memory (EEPROM), a FLASH memory, a Ferroelectric Random Access Memory (FeRAM), Resistive Random Access Memory (RRAM or ReRAM), or a Magnetoresistive Random Access Memory (MRAM), for example. Some embodiments may include a single memory, such as memory block 102 and other embodiments may include two or more memory blocks (not shown). In some embodiments, memory block 102 may be configured to store program instructions that may be executed by processor 101. Memory block 102 may, in other embodiments, be configured to store data to be processed, such as graphics data, for example.

I/O block 103 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, graphics processing subsystems, or any other suitable type of peripheral devices. In some embodiments, I/O block 103 may be configured to implement a version of Universal Serial Bus (USB) protocol, IEEE 1394 (Firewire®) protocol, or, and may allow for program code and/or program instructions to be transferred from a peripheral storage device for execution by processor 101. In one embodiment, I/O block 103 may be configured to perform the data processing necessary to implement an Ethernet (IEEE 802.3) networking standard.

In some embodiments, I/O block 103 may include functions associated with general purpose I/O pins. I/O pins may provide input and output functions, such as driving one or more I/O pins to high or low voltage levels or sensing a high or low voltage level on a given pin. Some or all I/O pins may also include interrupt capabilities, such that, when configured as an interrupt, a given I/O pin may generate an interrupt request signal to processor 101 when an input to the given I/O pin is asserted. In various embodiments, an asserted input may correspond to a transition from a low to high voltage level or from a high to a low voltage value. In some embodiments, I/O pins may multiplex the general purpose functions with functions for other functional blocks within SoC 100. For example, in addition to general purpose functions and interrupt capabilities, some I/O pins may be multiplexed to share a physical pin with a USB interface, Ethernet interface, or any function requiring an interface outside of the chip.

I/O block 103 may also include universal asynchronous receiver/transmitter (UART) 103a. UART 103a may support a serial communications interface to chips external to SoC 100. Several standard communication protocols may be supported by UART 103a, such as RS-232, RS-422, or RS-485. In addition, UART 103a may support custom protocols to meet particular needs of a given system. UART 103a may include at least one input and at least one output. UART 103a may be capable of communicating with another chip using two wires, a single input and a single output, as the connection to the other chip. In other embodiments, a single wire may be used with the input and output multiplexing time on the single wire.

Power management unit 104 may be configured to manage power delivery to some or all of the functional blocks included in SoC 100. Power management unit 104 may comprise sub-blocks for managing multiple power supplies for various functional blocks. In various embodiments, the power supplies may be located in analog/mixed-signal block 105, in power management unit 104, in other blocks within SoC 100, or come from external to SoC 100, coupled through power supply pins. Power management unit 104 may include one or more voltage regulators to adjust outputs of the power supplies to various voltage levels as required by functional blocks within SoC 100.

Analog/mixed-signal block 105 may include a variety of circuits including, for example, a crystal oscillator, a phase-locked loop (PLL) or frequency-locked loop (FLL), an analog-to-digital converter (ADC), and a digital-to-analog converter (DAC) (all not shown). In some embodiments, analog/mixed-signal block 105 may also include radio frequency (RF) circuits that may be configured for operation with cellular telephone or wireless networks. Analog/mixed-signal block 105 may include one or more voltage regulators to supply one or more voltages to various functional blocks and circuits within those blocks.

Clock management unit 106 may be configured to enable, configure and manage outputs of one or more clock sources, such as, for example clock generator 107. In various embodiments, the clock sources may be located in analog/mixed-signal block 105, in clock management unit 106, in other blocks with SoC 100, or come from external to SoC 100, coupled through one or more I/O pins. In some embodiments, clock management 106 may be capable of dividing a selected clock source before it is distributed throughout SoC 100. Clock management unit 106 may include registers for selecting an output frequency of a PLL, FLL, or other type of adjustable clock source. A suitable clock source may be a sub-module of analog/mixed signal block 105 or clock management unit 106. In other embodiments, the suitable clock source may be a separate module within SoC 100.

System bus 110 may be configured as one or more buses to couple processor 101 to the other functional blocks within the SoC 100 such as, e.g., memory block 102, and I/O block 103. In some embodiments, system bus 110 may include interfaces coupled to one or more of the functional blocks that allow a particular functional block to communicate through the bus. In some embodiments, system bus 110 may allow movement of data and transactions (i.e., requests and responses) between functional blocks without intervention from processor 101. For example, data received through the I/O block 103 may be stored directly to memory block 102.

It is noted that the SoC illustrated in FIG. 1 is merely an example. In other embodiments, different functional blocks and different configurations of functions blocks may be possible dependent upon the specific application for which the SoC is intended. It is further noted that the various functional blocks illustrated in SoC 100 may operate at different clock frequencies.

Figure 2:
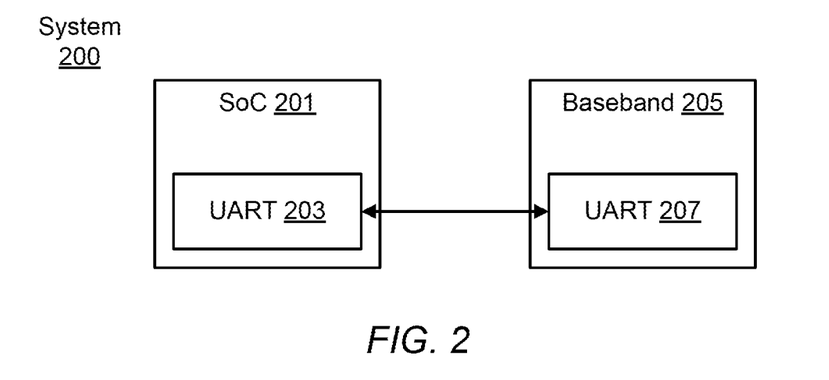
FIG. 2 illustrates a block diagram of an embodiment of two devices connected by data transceivers.

Turning to FIG. 2, a block diagram of an embodiment of a system containing two processors is illustrated. System 200 may include two processors coupled by a communications link. SoC 201 may include universal asynchronous receiver/transmitter (UART) 203. Baseband 205 may include UART 207, coupled to UART 203.

SoC 201 may correspond to SoC 100 in FIG. 1 or to another suitable SoC device. In some embodiments, SoC 201 may correspond to a processor in a smartphone or tablet and may be configured to execute applications installed on the phone or tablet. Baseband 205 may correspond to a baseband processor configured to interface with one or more wireless networks associated with the phone or tablet. SoC 201 may include UART 203 as a resource for communicating with baseband 205 via UART 207. UART 203 and UART 207 may function in accordance to the description of UART 103a above. UART 203 may be capable of communicating with other chips in addition to baseband 205. An input of UART 203 may be coupled to an output of UART 207 and an output of UART 203 may be coupled to an input of UART 207.

In some embodiments, SoC 201 may enter a reduced power state to conserve a power source, such as a battery. While SoC 201 is in a reduced power state, baseband 205 may remain active to, in the case of a smartphone for example, maintain communications with a cell tower or other wireless network. In such an example, baseband 205 may track a location of the smartphone based on communications with that wireless network. If a change of location is noted, then baseband 205 may need to wake SoC 201 such that SoC 201 can update any location aware applications that may be running in a background process. In some embodiments, baseband 205 may be a function specific processor and may not be programmed or configured to keep track of a power state of SoC 201. In such an embodiment, in order for baseband 205 to communicate with SoC 201 without tracking the state of SoC 201, the communications protocol between UART 203 and UART 207 may need to allow for the receiving UART (UART 203 in this example) to change from an inactive state to an active state in response to the transmitting UART (UART 207 in this example) sending a routine message. The routine message may be the same regardless of the state of the receiving UART. Details of such a protocol will be presented below.

It is noted that an SoC and a baseband processor are used in the embodiment of FIG. 2 as an example for demonstrating the disclosed concepts. Other types of processors are known and contemplated for use with the disclosed concepts.

Figure 3:
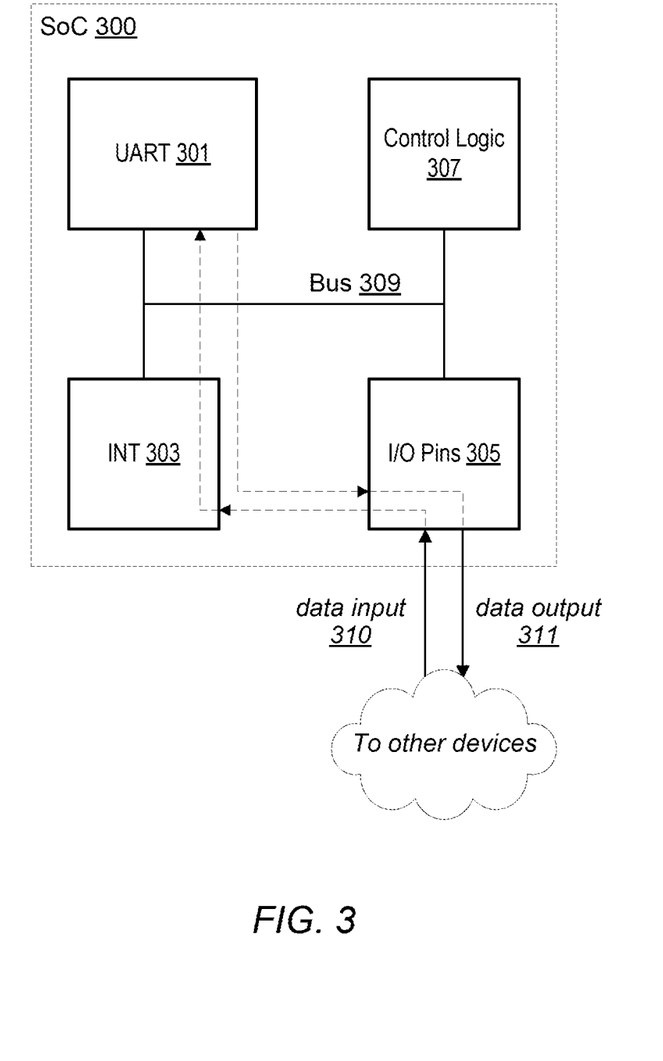
FIG. 3 shows a block diagram of a data transceiver and related functional blocks from another embodiment of an SoC.

Moving to FIG. 3, an embodiment of SoC 300 is illustrated. While the illustrated embodiment may show only functional blocks required to demonstrate the disclosed concepts, SoC 300 may include other functional blocks that are not shown. SoC 300 may correspond to SoC 201 in FIG. 2 and may include UART 301, interrupt logic (INT) 303, I/O pins 305, and control logic 307, all coupled through bus 309.

UART 301 may function as described above in regards to UART 103a. UART 301 may multiplex an input port and an output port through I/O pins 305. Input and output signals may be coupled between UART 301 and I/O pins 305 via bus 309 or in other embodiments, via connections not shown in FIG. 3. UART 301 may be coupled, through I/O pins 305, to a UART on another chip, such as, e.g., baseband 205 as shown in FIG. 2. UART 301 may also be capable of being placed in a low power mode and/or disabled and turned off when not in use in order to conserve system power.

INT 303 may include interrupt logic for interrupt capability on I/O pins 305. The same I/O pins 305 that are coupled to the input and output of UART 301 may include interrupt capability. In other embodiments, only the pin coupled to the input of UART 301 may include interrupt capabilities. INT 303 may include logic for enabling and disabling interrupt functions of I/O pins 305. Interrupt functions may include enabling the interrupt for each individual pin of I/O pins 305 or jointly for a group of pins. Other functions of INT 303 may include selecting a polarity of an asserted interrupt, i.e., if an interrupt is asserted on a rising or high voltage signal of an enabled interrupt pin or on a falling or low voltage signal. Additional functions, such as a priority level and identifying a particular interrupt service routine may also be included in INT 303.

I/O pins 305 may include one or more input/output pins for interfacing with components external to SoC 300. In various embodiments, I/O pins 305 may include any combination of input-only pins, output-only pins, or pins selectable as either inputs or outputs. I/O pins 305 may provide capability to distinguish between high and low logic levels applied to the pins from external sources and buffer the determined state in a corresponding data register. I/O pins 305 may also be capable to drive high and low logic levels to external components depending on a stored value in the corresponding data register. A given I/O pin in I/O pins 305 may be multiplexed (also referred to herein as "muxed") with one or more other functional blocks. For example, two I/O pins may be muxed with UART 301, data input 310 muxed with a data receiver of UART 301 and a data output 311 muxed with a data transmitter of UART 301. When UART 301 has control of the first pin and the second pin, UART 301 may be capable of sending and receiving data with another UART device. The first pin may also be muxed with interrupt functions from INT 303. In some embodiments, each function may be available on a given I/O pin one at a time, such that, for example, if an interrupt function is enabled on the first pin, the data receiver function cannot be enabled. In other embodiments, multiple functions may be available at the same time, such that, for example, the data receiver function and interrupt function are both available at the same time.

It is noted that "logic 1", "logic high", "high state", or "high logic level" refers to a voltage sufficiently large to turn on an n-channel MOSFET and turn off a p-channel MOSFET in a CMOS logic circuit, while "logic 0", "logic low", "low state", or "low logic level" refers to a voltage that is sufficiently small enough to do the opposite. In other embodiments, different technologies may result in different voltage levels for "low" and "high." The embodiments illustrated and described herein may employ CMOS circuits. In various other embodiments, however, other suitable technologies may be employed.

Control logic 307 may provide logic for enabling and disabling various features of UART 301, INT 303, and I/O pins 305. Control logic 307 may represent a single logic circuit designed to perform these functions or may represent respective pieces of logic from various other functional blocks that together control the interaction of the blocks illustrated in FIG. 3. Control logic 307 may determine which function or functions are enabled for as given pin of I/O pins 305 at any time. Control logic 307 may also configure INT 303 to configure the interrupt capability for each of the pins of I/O pins 305. UART 301 may be configured for a specific operating or low power mode by control logic 307.

It is noted that the embodiment of FIG. 3 is merely for demonstrative purposes and other embodiments may vary in organization and number of blocks required to perform similar functions. For example, although UART 301 is illustrated as a communications interface, other types of interfaces, such as, e.g., a serial peripheral interface (SPI) or an inter-integrated circuits (I²C) interface may be substituted.

Figure 4:
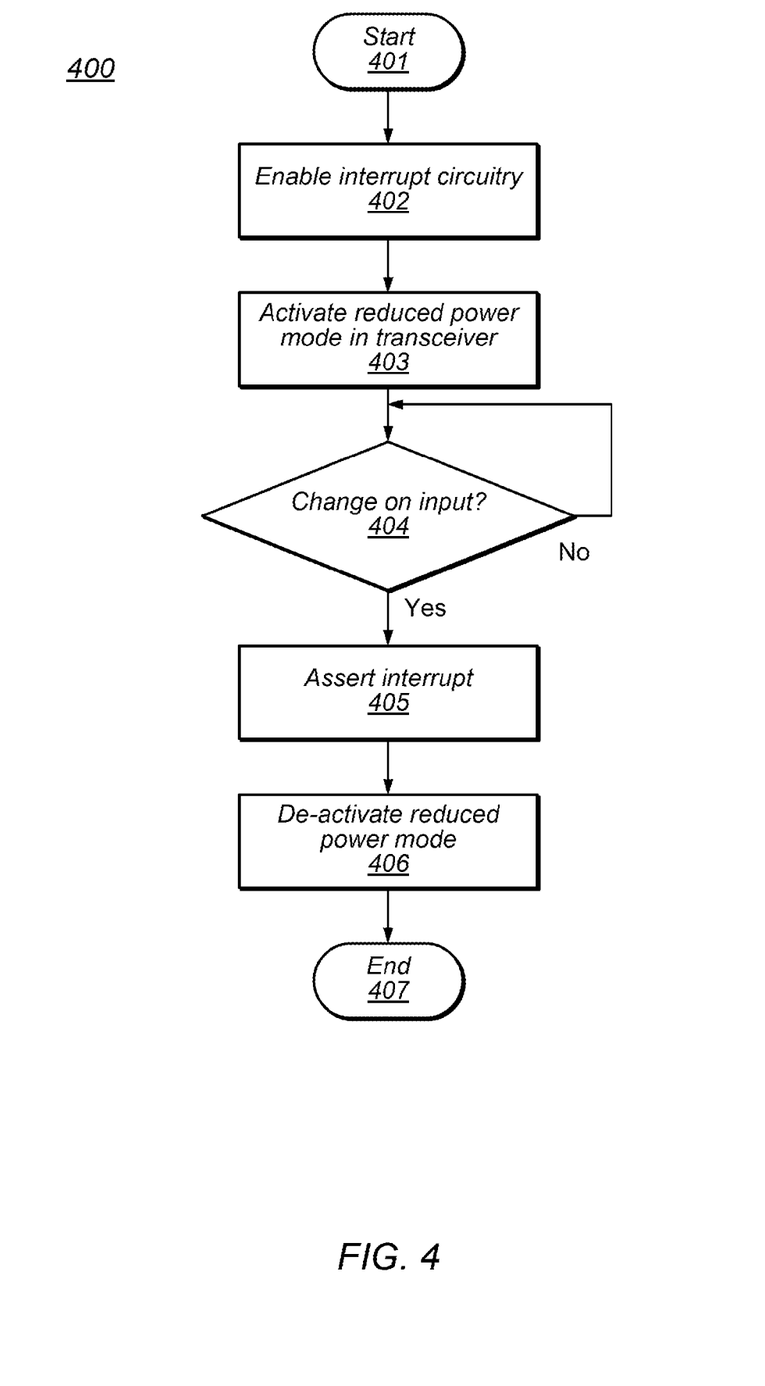
FIG. 4 is a flowchart illustrating operation of an embodiment of a data transceiver operating in a reduced power mode.

Turning now to FIG. 4, a flowchart showing operation of one embodiment of a data transceiver operating in a reduced power mode is presented. Method 400 may, in various embodiments, be used for reducing power associated with a data transceiver such as, for example, UART 301 in SoC 300 in FIG. 3. Referring collectively to SoC 300 in FIG. 3 and the flowchart in FIG. 4, the method may begin in block 401.

An interrupt function may be enabled on data input 310 (block 402). In various embodiments, the interrupt may be configured to assert on a low to high transition on data input 310, while, in other embodiments, a high to low transition may be employed. The data input function to UART 301 may continue to be operational or may be disabled upon the interrupt function being enabled on data input 310.

SoC 300 may enter a power saving state in which one or more circuits within SoC 300 are placed into reduced power modes. Responsive to entering the power saving state, control logic 307 may activate a reduced power mode for UART 301 (block 403). In some embodiments, the reduced power mode may correspond to a stand-by mode in which UART 301 continues to receive power at a reduced level, while, in other embodiments, UART 301 may be disabled by disconnecting UART 301 from a power supply. Alternatively, or additionally, the stand-by mode may include halting a clock signal to at least a portion of UART 301.

The method may depend upon a detected change on data input 310 (block 404). Data input 310 may be monitored, by circuits in I/O pins 305 or INT 303, for example, to determine if an input signal on data input 310 has transitioned. If no change is detected on data input 310, then the method may continue to monitor data input 310 in block 404. Otherwise, if a transition is detected, the method may move to block 405.

An interrupt associated with INT 303 may be asserted in response to detecting a signal transition on data input 310 (block 405). Upon assertion of the interrupt, a processor in SoC 300 may start to service the interrupt by completing a current instruction and then branching to an interrupt service routine (ISR), or other program instructions, corresponding to the asserted interrupt.

The corresponding ISR may include instruction for the processor to de-activate the reduced power mode of UART 301 (block 406). The ISR may instruct the processor to enable UART 301 by sending commands to control logic 307. In other embodiments, control logic 307 may be coupled to INT 303 and de-activate the reduced power mode without intervention of a processor. Once the reduced power mode is de-activated, UART 301 may begin to receive data through data input 310.

It is noted that method 400 is merely an example. In other embodiments, steps may be performed in an order other than the order illustrated FIG. 2. For example, step 403 may be performed before step 402.

Figure 5:
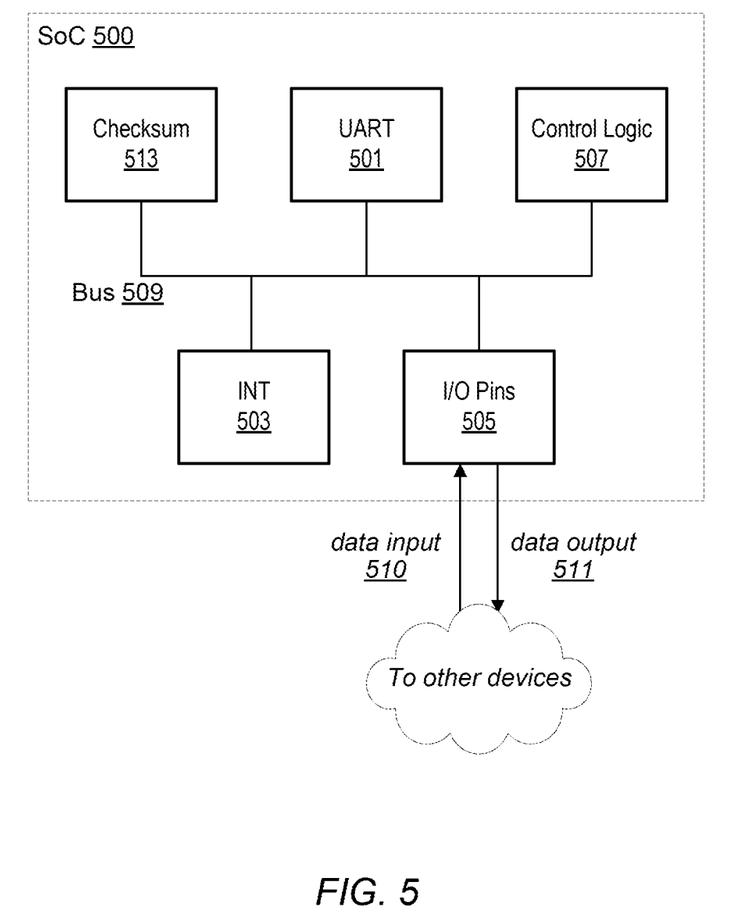
FIG. 5 is a block diagram of a data transceiver and related functional blocks from a further embodiment of an SoC.

Moving now to FIG. 5, a block diagram of a data transceiver and related functional blocks from SoC 500 is illustrated. SoC 500 may include similar blocks as SoC 300 from FIG. 3, such as UART 501, INT 503, I/O pins 505, control logic 507, bus 509, data input 510 and data output 511 which may correspond to UART 301, INT 303, I/O pins 305, control logic 307, bus 309 data input 310 and data output 311 included in SoC 300. SoC 500 may include an additional functional block, checksum unit 513, coupled to bus 509.

Checksum unit 513 may be used to implement a checksum algorithm to generate a checksum value for a block of data values. A checksum value may be determined by operating on a series of data values using the checksum algorithm. A fixed length value is generated that may be used to validate that a data set has been transferred correctly. Checksum values for two data sets may differ significantly even when there is only a slight difference between the two data sets. In other embodiments, a hashing function or a parity checker may be used in place of checksum unit 513.

Checksum unit 513 may be used on data received by UART 501 to determine if data has been received correctly. UART 501 may also receive a checksum value from the device sending data for the same data set using the same checksum algorithm. SoC 500 may compare the received checksum value to the generated checksum value and if the values are the same, then the received data set may be determined to be correct. If the received checksum value differs from the generated checksum value, then the received data set may include errors.

SoC 500 may correspond to SoC 201 in FIG. 2 and may send and receive data with baseband 205. UART 501 may, therefore, correspond to UART 203, coupled to UART 207. If, during a data transfer, UART 501 receives only part of a data set from UART 207, then a checksum generated by checksum unit 513 using the portion of the data set may differ from a checksum generated by baseband 205 using the complete data set, even if the received portion of the data set matches the corresponding transmitted portion of the data set. The generated checksum value may, therefore, be used to determine if all data from UART 207 has been received. For example, if UART 501 is placed in a reduced power mode, as described by method 400 of FIG. 4, and then awoken by an asserted interrupt responsive to a transition on data input 510. UART 501 may start to receive data on data input 510 after UART 501 has recovered from the reduced power mode. In some embodiments, recovery from the reduced power mode may take longer than the time UART 207 needs to send several bytes of data. In such a case, UART 501 may miss one or more bytes of data, which may, in turn, result in a mismatch between the generated checksum value and the received checksum value. In response to the checksum mismatch, SoC 500 may send a request back to baseband 205 requesting the data to be resent.

It is noted that the block diagram of FIG. 5 is just one embodiment of an SoC and only the functional blocks necessary to demonstrate the disclosed concepts have been included. SoC 500 may include other functional blocks not illustrated. In other embodiments, SoC 500 may include different functional blocks. For example, checksum unit 513 may be replaced with another type of function for determining if received data is valid.

Figure 6:
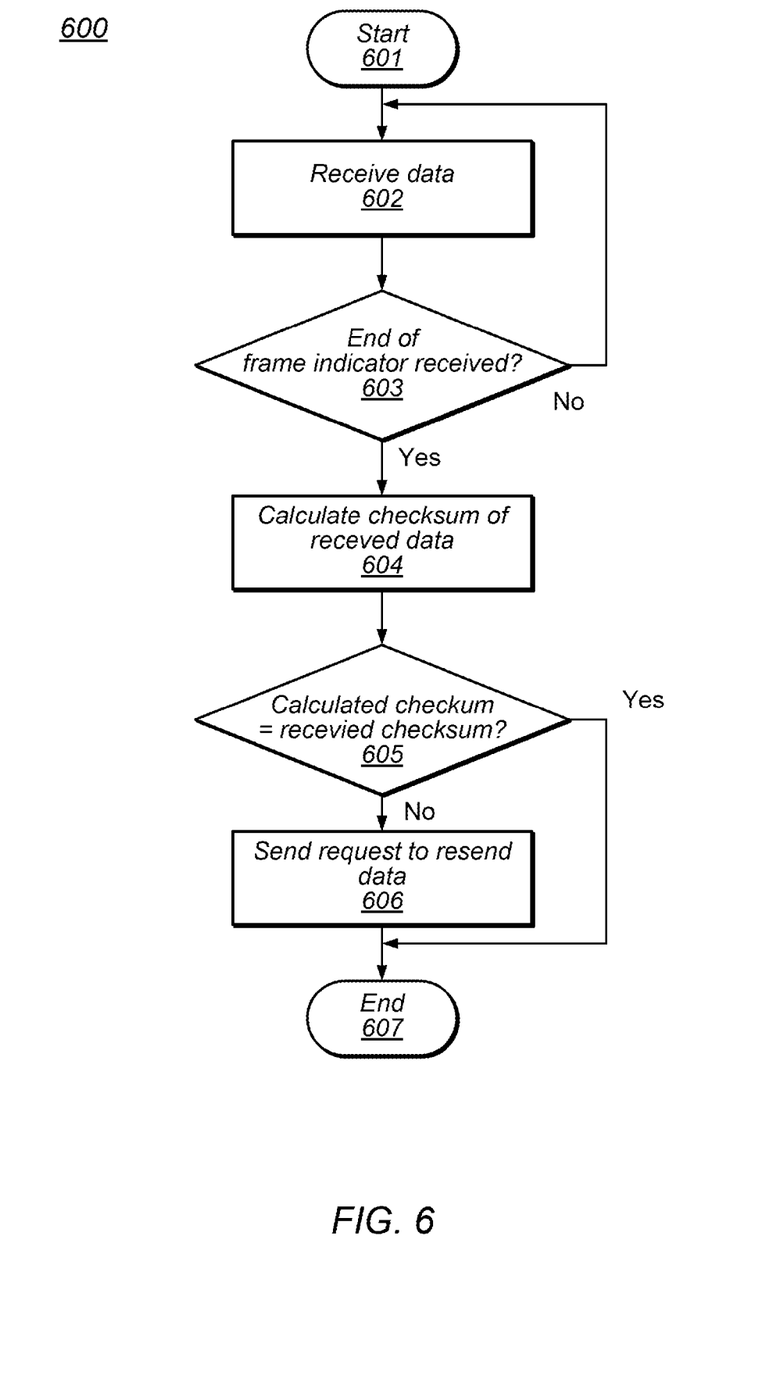
FIG. 6 is a flowchart illustrating operation of an embodiment of a data transceiver protocol.

Turning to FIG. 6, a flowchart illustrating operation of one embodiment of a data transceiver protocol is presented. Method 600 may be used in conjunction with devices coupled by data transceivers, such as, for example, SoC 201 and baseband 205 in FIG. 2. SoC 201 may include functional blocks such as shown in SoC 500 in FIG. 5. Referring collectively to FIG. 2, FIG. 5 and the flowchart in FIG. 6, the method may begin in block 601.

UART 501 may receive data from baseband 205 (block 602). UART 501 may be in a reduced power mode and may be awoken, i.e., exit the reduced power mode, to receive the data via UART 207. UART 501 may have been awoken responsive to a start bit of a data transfer being sent by UART 207. The start bit may generate a first transition on data input 510. This first transition may cause an interrupt to be asserted in SoC 500 which may wake UART 501 from the reduced power mode. After recovering from the reduced power mode, UART 501 may receive data sent by baseband 205 through UART 207. UART 501 may not receive one or more of the first data bytes sent by UART 207 while recovering from the reduced power mode.

The method may then depend on the received data (block 603). UART 501 may determine if one or more bytes of received data correspond to an end of frame indicator. An end of frame indicator may be a reserved value of one or more bytes in length that indicate that the end of a data packet has been reached. In some embodiments, upon receiving an end of frame indicator, the receiving UART, i.e., UART 501, may send an acknowledgement that data and the indicator have been received. In various embodiments, the acknowledgement may be sent after the receiving device (i.e., SoC 500) has validated the received data. If an end of frame indicator has not been received, then the method may return to block 602 to receive further data. Otherwise, upon receiving the end of frame indicator, the method may move to block 604 to calculate a checksum.

SoC 500 may generate a checksum value by sending the received data to checksum unit 513 (block 604). In some embodiments, checksum unit 513 may be replaced with a parity checker or with a hashing function. One or more bytes of the received data may be sent to checksum unit 513 until the last byte of data has been sent. After the last byte of data has been processed, a generated checksum value may be available from checksum unit 513. The data used to generate the checksum value may not include the end of frame indicator and may also exclude one or more bytes before the indicator.

The method may now depend on a value of the generated checksum and a value of a received checksum (block 605). As part of the received data packet, UART 501 may receive a checksum value generated by baseband 205 using the sent data. In various embodiments, the received checksum may be the last byte or bytes of data sent before sending the end of frame indicator, one of the first byte or bytes of data to be sent, or the received checksum may be sent in a second data packet after the end of frame indicator. SoC 500 may compare the value of the received checksum to the value of the generated checksum. If the two checksum values are equal, then the method may end in block 607. In some embodiments, an acknowledgement may be sent by SoC 500 to baseband 205 to indicate the data was received correctly. If the two checksum values are not equal, then the method may move to block 606 to request that data be resent.

In response to determining the two checksum values are not equal, SoC 500 may send a request to baseband 205 to resend the data packet (block 606). The two checksum values may not match due to a variety of reasons, including UART 501 missing initial data bytes while recovering from the reduced power mode. Other reasons for the checksum mismatch may include a glitch on data input 510 and noise in baseband 205 resulting in a wrong data bit being sent. SoC 500 may send a request via UART 501 for baseband 205 to resend the last data packet. The method may end in block 607.

It is noted that method 600 is merely an example for demonstration purposes. In other embodiments, steps may be performed in a different order than illustrated and/or other steps may be included. For example, an acknowledgement step may be included between block 605 and block 607 when the calculated checksum matches the received checksum.

Figure 7:
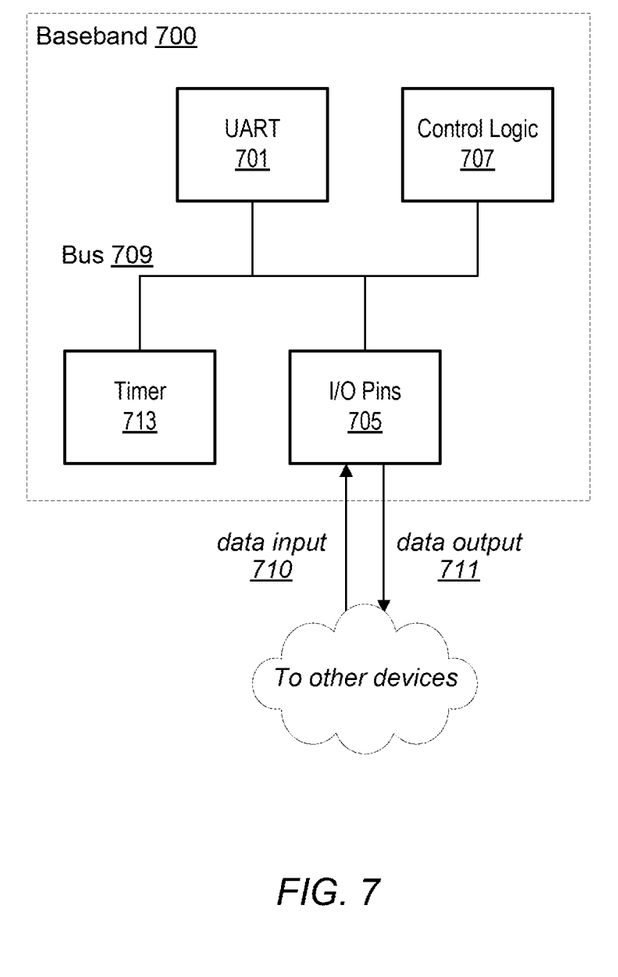
FIG. 7 is a block diagram of a data transceiver and related functional blocks from an embodiment of a baseband processor.

Moving on to FIG. 7, a block diagram of a data transceiver and related functional blocks from baseband 700 is illustrated. Baseband 700 may include similar blocks as SoC 300 from FIG. 3, such as UART 701, I/O pins 705, control logic 707, bus 709, data input 710 and data output 711 which may have similar functions as UART 301, INT 303, I/O pins 305, control logic 307, bus 309 data input 310 and data output 311 as described above in regards to SoC 300. Baseband 700 may include an additional functional block, timer 713, coupled to bus 709.

Baseband 700 and SoC 300 may be coupled together via UART 701 and UART 301, similar to the illustration of FIG. 2. Data output 711 may be coupled to data input 310 of SoC 300 and data input 710 may be coupled to data output 311. Baseband 700 and SoC 300 may share data over these signal couplings. Under certain circumstances, such as, e.g., if no communications have occurred via UART 301, control logic 307 in SoC 300 may activate a reduced power mode for UART 301 as described above. Responsive to this idle communication link, baseband 700 may de-assert data output 711. In some embodiments, when UART 701 is active, but idle, data output 711 may be driven to a logic high to indicate an active, but idle condition. If UART 701 remains idle for a predetermined amount of time, then control logic 707 may disable control of data output 711 from UART 701 and give control to I/O pins 705. I/O pins 705 may drive a logic low on data output 711. Timer 713 may be used to indicate if the predetermined amount of time expired. UART 701 may be placed into a reduced power mode similar to UART 301.

Under such circumstances, if baseband 700 has a data packet to send to SoC 300, then control logic 707 may de-activate the reduced power mode of UART 701. Control logic 707 may also return control of data output to UART 701, once UART 701 is active. Data output 711 may transition from a logic low to a logic high in response to UART 701 resuming control. In some embodiments, this logic low to logic high transition on data output 711 may trigger interrupt logic in INT 303 on SoC 300. Control logic 707 may configure timer 713 to assert a signal after a second predetermined time has elapsed. Upon the assertion of the timer signal, UART 701 may start to send data via data output 711. The second predetermined amount of time may be long enough for UART 301 on SoC 300 to recover from the reduced power mode in response to the interrupt from INT 303. By delaying an amount of time before sending data, UART 301 may be active and able to receive all of the data in the data packet to be sent by UART 701.

It is noted that the block diagram of FIG. 7 is merely one embodiment for demonstration purposes. The number of functional blocks shown has been reduced for the sake of clarity. Baseband 700 may include more functional blocks such as, for example, a processor, interrupt logic, and one or more memories.

Figure 8:
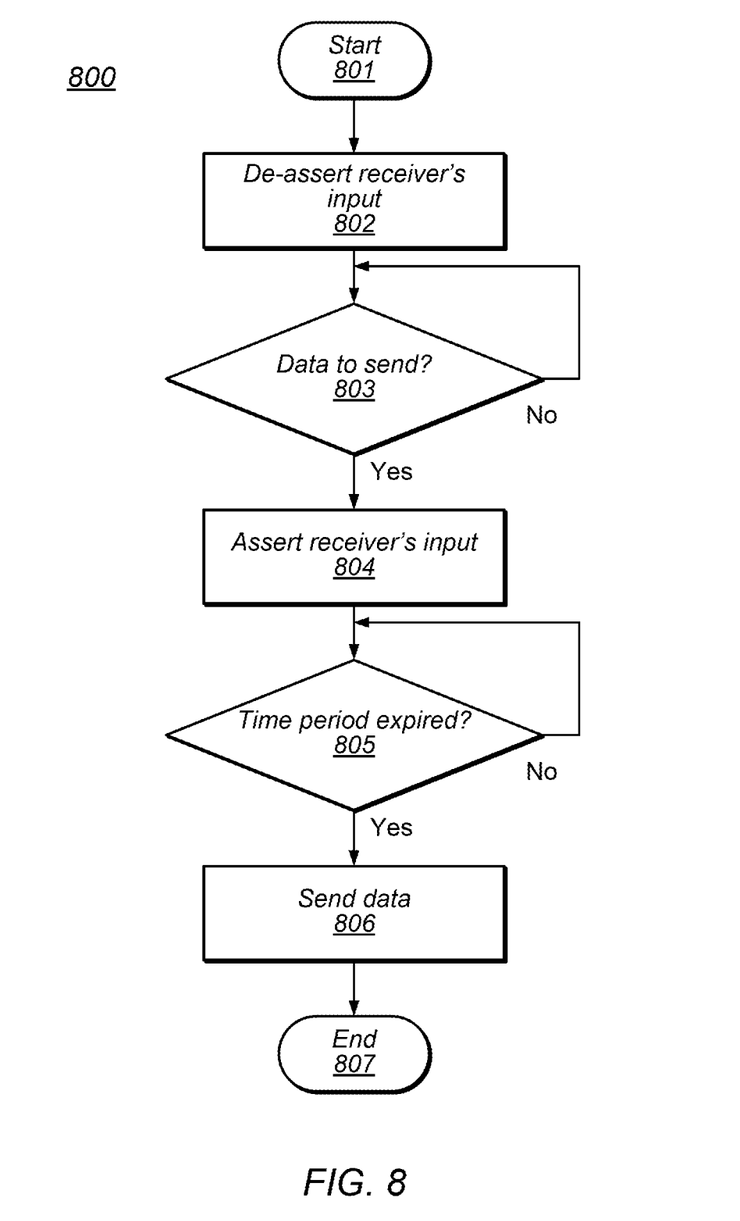
FIG. 8 is a flowchart illustrating operation of another embodiment of a data transceiver protocol.

Turning to FIG. 8, a flowchart illustrating operation of another embodiment of a data transceiver protocol is presented. Method 800 of FIG. 8 may be used by a device such as, for example baseband 700 as part of a communication protocol with another device such as, for example, SoC 300. Referring collectively to SoC 300 in FIG. 3, baseband 700 in FIG. 7 and FIG. 8, the method begins in block 801.

Baseband 700 may de-assert data output 711 which may be coupled to data input 310 in SoC 300 (block 802). Responsive to UART 701 and UART 301 remaining idle for a first predetermined amount of time, control logic 307 may transfer control of data input 310 to INT 303. Control logic may also place UART 301 in a reduced power mode, such as a stand-by mode in which a supply voltage level to UART 301 may be reduced and/or a clock source to UART 301 may be halted. INT 303 may enable interrupt logic on data input 310, such that a logic low to logic high transition may assert an interrupt signal. Control logic 707 may transfer control of data output 711 to I/O 705 and similarly place UART 701 in a reduced power mode. I/O 705 may be configured to drive a logic low on data output 711. In other embodiments, INT 303 may assert an interrupt on a high to low transition on data input 310 and I/O 705 may be configured to drive a logic high on data output 711. In one embodiment, I/O 705 may be configure to not drive any logic level and a pull-up device or pull-down device may be used to apply the appropriate logic level to data input 310.

The method may depend on baseband 700 having data to send to SoC 300 (block 803). Functional blocks other than UART 701 may remain active in baseband 700 and one or more active blocks may have data that needs to be sent to SoC 300. If baseband 700 does not have data to send to SoC 300, then the method may remain in block 803. Otherwise, the method may move to block 804 to prepare for sending data.

UART 701 may assert data output 711 resulting in a logic low to logic high transition on data input 310 (block 804). Upon determining that data needs to be sent, control logic 707 may place UART 701 in an active mode and may transfer control of data output 711 from I/O 705 to UART 701. UART 701 may drive data output 711 to a logic high when active and idle. INT 303 in SoC 300 may assert an interrupt in response to the transition on data input 310. The assertion of the interrupt may cause control logic 307 to place UART 301 into an active mode, which may require a level of supply voltage to UART 301 to be increased and/or a clock signal to UART 301 to be enabled. UART 301 may, therefore, require some period of time to transition from the stand-by mode into the active mode. Control logic 307 may transfer control of data input 310 from INT 303 to UART 301 upon UART 301 completing a transition into the active mode.

The method may now depend upon a time period expiring (block 805). In response to placing UART 701 in an active mode, control logic 707 may also initiate timer 713 to assert a signal after a second predetermined amount of time has elapsed. This second predetermined amount of time may be selected in order to provide time for UART 301 to recover from the reduced power mode and to be prepared to receive data. If the second predetermined time period has not expired, then the method may remain in block 805. Otherwise, the method may move to block 806 to begin a data transfer.

UART 701 may begin sending data to UART 301 (block 806). By the time the second time period expires, UART 301 may have exited the reduced power mode and be in an active mode ready to receive data on data input 310. UART 301 may be capable of receiving all data in the transmitted data packet from UART 701. The method may end in block 807.

It is noted that method 800 is merely one embodiment for demonstrating the disclosed concepts. In other embodiments, steps may be performed in a different order than illustrated and/or other steps may be included. For example, a data validation step may be included between block 806 and block 807 after data has been received.

Figure 9:
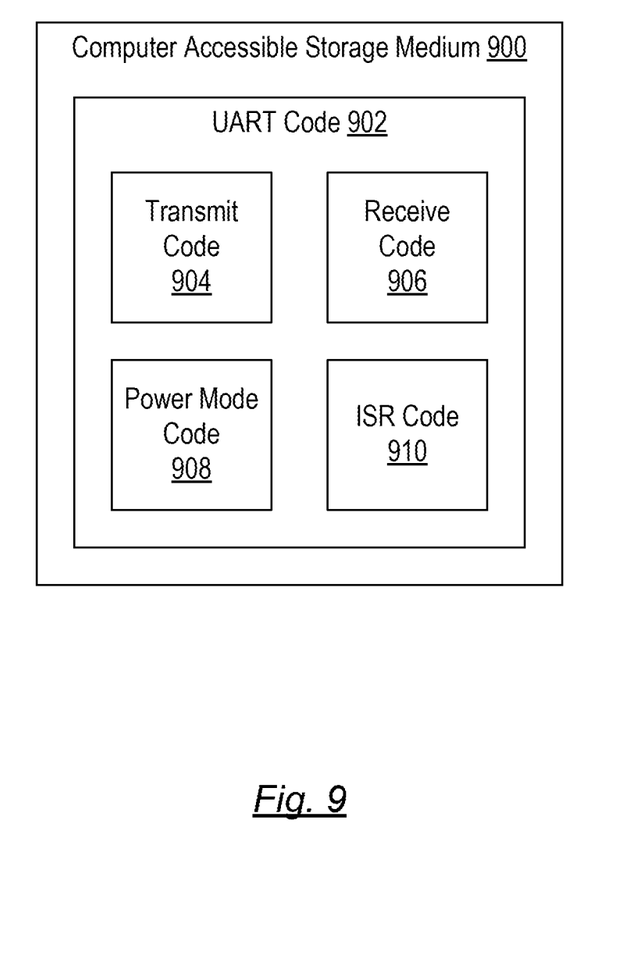
FIG. 9 is a block diagram of one embodiment of a computer accessible storage medium.

In FIG. 9, a block diagram of one embodiment of a computer accessible storage medium 900 is shown. Generally speaking, computer accessible storage medium 900 may include any storage media accessible by a computer during use to provide instructions and/or data to the computer. For example, computer accessible storage medium 900 may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 900 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 900 in FIG. 9 may store UART component code 902. The UART component code 902 may include instructions which, when executed on a device including a UART and a processor, such as, SoC 100 in FIG. 1, implement the methods described above for sending and receiving data across the UART. UART component code 902 may include transmit code 904, and receiver code 906, which may each include instructions for transmitting and receiving data respectively. UART code 902 may further include power mode code 908 which may be used in conjunction with control logic 307 to place the UART into one or more reduced power modes. UART code 902 may also include ISR code 910, which may be executed by the processor in response to an asserted interrupt. A carrier medium may include computer accessible storage media 900 as well as a transmission media such as wired or wireless transmission.

It is noted that computer accessible storage medium 900 in FIG. 9 is one embodiment of a computer accessible storage medium. Computer accessible storage medium 900 may include more code for various other functions performed by the processor and SoC 100.

It is also noted that various SoC devices and baseband processors have been used as examples for describing the disclosed concepts. Other devices are known and contemplated that may be used with the concepts disclosed herein. For example, microcontrollers and smart sensors may include UARTs capable of implementing the disclosed methods. Additionally, the disclosed methods may be applied to transceivers other than UARTs, such as, I²C and SPI, for example.

Numerous variations and modifications will become apparent to those skilled in the art once the above disclosure is fully appreciated. It is intended that the following claims be interpreted to embrace all such variations and modifications.

What is claimed is:
1. A system comprising:
   a first device configured to transmit serial data; and
   a second device, coupled to the first device, wherein the second device includes a transceiver and interrupt logic, wherein the second device is configured to:

activate the interrupt logic for a pin of the second device, wherein the pin is coupled to the transceiver and configured to receive the serial data; and enable a reduced power mode for the transceiver, wherein a power consumption of the transceiver operating in the reduced power mode is less than the power consumption of the transceiver operating in an operating mode;

wherein the first device is further configured to transmit serial data to the second device by changing a voltage level of the pin of the second device; and wherein the second device is further configured to:
assert an interrupt signal in response to the change in the voltage level of the pin of the second device;
de-activate the reduced power mode for the transceiver in response to the assertion of the interrupt signal; and
receive, via the pin and the transceiver, at least a portion of the serial data from the first device in response to the assertion of the interrupt signal.

2. The system of claim 1, wherein the second device is further configured to activate the interrupt logic for the pin in response to a determination that the transceiver has remained idle for a threshold amount of time.

3. The system of claim 1, wherein the second device is further configured to send a request, via the transceiver, to the first device to resend the serial data in response to a determination that the at least a portion of the received serial data is invalid.

4. The system of claim 3, wherein to determine the at least a portion of the received serial data is invalid, the second device is further configured to:
calculate a checksum of the at least a portion of the received serial data in response to receiving an end of frame character; and
compare the calculated checksum to a received checksum.

5. The system of claim 1, wherein the first device is further configured to drive a first voltage level on the pin of the second device in response to a determination that a transmit buffer of the first device is empty.

6. The system of claim 5, wherein the first device is further configured to drive a second voltage level on the pin of the second device for a predetermined amount of time in response to the first device having data to transmit, wherein the predetermined amount of time is greater than or equal to an amount of time for the second device to deactivate the reduced power mode for the transceiver, wherein the second voltage level is greater than the first voltage level.

7. The system of claim 1, wherein the transceiver corresponds to a Universal Asynchronous Receiver/Transmitter (UART).

8. A method, comprising:
enabling interrupt circuitry coupled to a pin of a first serial data transceiver, wherein the pin is configured to receive serial data for the first serial data transceiver;
activating a reduced power mode of the first serial data transceiver;
changing, by a second serial data transceiver, a voltage level of the pin of the first serial data transceiver to transmit serial data to the first serial data transceiver;
asserting, by the interrupt circuitry, an interrupt in response to detecting the change of the voltage level on the pin of the first serial data transceiver; and
de-activating the reduced power mode of the first serial data transceiver in response to the assertion of the interrupt; and receiving, via the pin, at least a portion of the serial data from the second serial data transceiver in response to the assertion of the interrupt.

9. The method of claim 8, further comprising enabling the interrupt circuitry coupled to the pin in response to determining that the first serial data transceiver has remained idle for a threshold amount of time.

10. The method of claim 8, further comprising sending a request, by the first serial data transceiver, to the second serial data transceiver to resend the serial data in response to determining the at least a portion of the received serial data is invalid.

11. The method of claim 10, wherein determining the at least a portion of the received serial data is invalid further comprises:
calculating a checksum of the at least a portion of the received serial data in response to receiving an end of frame indicator; and
comparing the calculated checksum to a received checksum.

12. The method of claim 8, further comprising setting a pin of a second serial data transceiver, coupled to the pin of the first serial data transceiver, to output a first voltage level in response to determining that the second serial data transceiver is not transmitting.

13. The method of claim 12, further comprising providing a second voltage level to the pin of the first serial data transceiver, via the pin of the second serial data transceiver for a predetermined amount of time in response to the second serial data transceiver receiving serial data to transmit, wherein the predetermined amount of time is greater than or equal to an amount of time for de-activating the reduced power mode of the first serial data transceiver, wherein the second voltage level is greater than the first voltage level.

14. The method of claim 12, wherein changing the voltage level on the pin of the first serial data transceiver, comprises sending serial data, by the second serial data transceiver, to the first serial data transceiver using a Universal Asynchronous Receiver/Transmitter (UART) compatible communication protocol.

15. An apparatus comprising:
a serial data receiver coupled to a pin, wherein the serial data receiver is configured to receive serial data via the pin;
interrupt logic coupled to the pin; and
circuitry configured to:
enable the interrupt logic; and
activate a reduced power mode for the serial data receiver;
wherein the interrupt logic is configured to assert an interrupt signal in response to a detection of a change in a voltage level on the pin;
wherein the circuitry is further configured to de-activate the reduced power mode for the serial data receiver in response to the assertion of the interrupt signal; and
wherein the serial data receiver is further configured to receive at least a portion of serial data via the pin in response to the assertion of the interrupt signal.

16. The apparatus of claim 15, wherein the circuitry is further configured to enable the interrupt logic coupled to the pin in response to determining that the serial data transceiver has remained idle for a threshold amount of time.

17. The apparatus of claim 15, wherein the circuitry is further configured to request the serial data be resent in response to a determination that the at least a portion of the received serial data is invalid.

18. The apparatus of claim 17, wherein to determine the at least a portion of the received serial data is invalid, the circuitry is further configured to:
calculate a checksum of the at least a portion of the received serial data responsive to receiving an end of frame character; and
compare the calculated checksum to a received checksum.

19. The apparatus of claim 15, wherein the serial data receiver includes one or more circuit blocks, and wherein to enter the reduced power state, the serial data receiver is further configured to enter a stand-by mode, wherein the stand-by mode includes halting a clock signal to at least one of the one or more circuit blocks.

20. The apparatus of claim 15, wherein the serial data receiver includes one or more circuit blocks, and wherein to activate the reduced power mode for the serial data receiver, the circuitry is further configured to reduce a level of a power supply voltage to at least one of the one or more circuit blocks.

* * * * *